(12) United States Patent
Khawer et al.

(10) Patent No.: US 8,861,434 B2
(45) Date of Patent: Oct. 14, 2014

(54) METHOD AND SYSTEM FOR IMPROVED MULTI-CELL SUPPORT ON A SINGLE MODEM BOARD

(75) Inventors: Mohammad R. Khawer, Lake Hopatcong, NJ (US); Mugur Abulius, Villejuif (FR)

(73) Assignee: Alcatel Lucent, Paris (FR)

( * ) Notice: Subject to any disclaimer, the term of this patent is extended or adjusted under 35 U.S.C. 154(b) by 589 days.

(21) Appl. No.: 12/955,202

(22) Filed: Nov. 29, 2010

(65) Prior Publication Data

US 2012/0134320 A1   May 31, 2012

(51) Int. Cl.
*H04L 29/00* (2006.01)
*H04L 12/70* (2013.01)

(52) U.S. Cl.
USPC ........... 370/328; 710/260; 710/261; 710/262; 712/10

(58) Field of Classification Search
CPC ........... H04L 49/00; H04L 49/90; G06F 9/48; G06F 9/4806; G06F 9/4812; G06F 13/24
USPC .................. 370/328, 388; 710/230, 261, 262; 712/10
See application file for complete search history.

(56) References Cited

U.S. PATENT DOCUMENTS

| | | | |
|---|---|---|---|
| 5,408,464 A | 4/1995 | Jurkevich | |
| 5,913,230 A | 6/1999 | Richardson | |
| 6,115,748 A | 9/2000 | Hauser et al. | |
| 6,735,620 B1 | 5/2004 | Blackmore et al. | |
| 6,799,200 B1 | 9/2004 | Blackmore et al. | |
| 6,999,432 B2 | 2/2006 | Zhang et al. | |
| 7,003,042 B2 | 2/2006 | Morelos-Zaragoza et al. | |
| 7,089,289 B1 | 8/2006 | Blackmore et al. | |
| 7,093,013 B1 | 8/2006 | Hornok, Jr. et al. | |
| 7,096,034 B2 | 8/2006 | Zhang et al. | |
| 7,180,866 B1 | 2/2007 | Chartre et al. | |
| 7,206,966 B2 | 4/2007 | Barr et al. | |
| 7,254,812 B1 | 8/2007 | Menezes | |

(Continued)

FOREIGN PATENT DOCUMENTS

| | | |
|---|---|---|
| EP | 1 788 491 | 5/2007 |
| TW | 200813739 | 3/2008 |

(Continued)

OTHER PUBLICATIONS

Sathish K. Palaniappan and Pramod B. Nagaraja, Efficient data transfer through zero copy. Sep. 2008.*

(Continued)

*Primary Examiner* — Ayaz Sheikh
*Assistant Examiner* — Tarell Hampton
(74) *Attorney, Agent, or Firm* — Fay Sharpe LLP

(57) ABSTRACT

A system for providing multi-cell support within a single SMP partition in a telecommunications network is disclosed. The typically includes a modem board and a multi-core processor having a plurality of processor cores, wherein the multi-core processor is configured to disable non-essential interrupts arriving on a plurality of data plane cores and route the non-essential interrupts to a plurality of control plane cores. Optionally, the multi-core processor may be configured so that all non-real-time threads and processes are bound to processor cores that are dedicated for all control plane activities and processor cores that are dedicated for all data plane activities will not host or run any threads that are not directly needed for data path implementation or Layer 2 processing.

17 Claims, 4 Drawing Sheets

(56) References Cited

U.S. PATENT DOCUMENTS

| | | | |
|---|---|---|---|
| 7,352,693 B2 | 4/2008 | Seid et al. | |
| 7,451,456 B2 * | 11/2008 | Andjelic | 719/321 |
| 7,571,440 B2 | 8/2009 | Vessey et al. | |
| 7,590,050 B2 | 9/2009 | Foltak | |
| 7,603,256 B2 | 10/2009 | Cheng et al. | |
| 7,609,652 B2 | 10/2009 | Kellerer et al. | |
| 7,620,753 B1 | 11/2009 | Beaman et al. | |
| 7,656,815 B2 | 2/2010 | Kellerer et al. | |
| 7,668,191 B2 | 2/2010 | Steinback et al. | |
| 7,831,710 B2 | 11/2010 | Ing et al. | |
| 7,873,964 B2 * | 1/2011 | Huang et al. | 719/314 |
| 7,933,197 B2 | 4/2011 | Bryant et al. | |
| 7,953,915 B2 | 5/2011 | Ge et al. | |
| 8,024,417 B2 | 9/2011 | Mehrotra | |
| 8,059,532 B2 | 11/2011 | Riddle et al. | |
| 8,072,879 B2 | 12/2011 | Vasseur et al. | |
| 8,099,546 B2 | 1/2012 | Rostedt | |
| 8,271,996 B1 | 9/2012 | Gould et al. | |
| 8,504,744 B2 | 8/2013 | Khawer et al. | |
| 2002/0087710 A1 | 7/2002 | Aiken et al. | |
| 2003/0188233 A1 | 10/2003 | Lubbers et al. | |
| 2004/0062246 A1 | 4/2004 | Boucher et al. | |
| 2004/0081080 A1 | 4/2004 | Ji et al. | |
| 2004/0187117 A1 | 9/2004 | Orion et al. | |
| 2005/0008011 A1 | 1/2005 | Georgiou et al. | |
| 2005/0111389 A1 | 5/2005 | Dick et al. | |
| 2006/0003792 A1 | 1/2006 | Gholmieh et al. | |
| 2006/0041737 A1 | 2/2006 | Kumagai | |
| 2006/0046819 A1 | 3/2006 | Nguyen et al. | |
| 2007/0010281 A1 | 1/2007 | Sebire | |
| 2007/0104204 A1 * | 5/2007 | Brokenshire et al. | 370/395.1 |
| 2007/0195723 A1 | 8/2007 | Attar et al. | |
| 2007/0220294 A1 | 9/2007 | Lippett | |
| 2008/0002681 A1 | 1/2008 | Bajic et al. | |
| 2008/0002702 A1 | 1/2008 | Bajic et al. | |
| 2008/0107014 A1 | 5/2008 | Huang et al. | |
| 2008/0148291 A1 | 6/2008 | Huang et al. | |
| 2008/0276056 A1 | 11/2008 | Giacomoni et al. | |
| 2009/0055826 A1 | 2/2009 | Bernstein et al. | |
| 2009/0080369 A1 | 3/2009 | Uminski et al. | |
| 2009/0097397 A1 | 4/2009 | Moreira | |
| 2009/0122756 A1 | 5/2009 | Gu et al. | |
| 2009/0207726 A1 | 8/2009 | Thomson et al. | |
| 2009/0228890 A1 | 9/2009 | Vaitovirta et al. | |
| 2009/0248934 A1 * | 10/2009 | Ge et al. | 710/261 |
| 2010/0008218 A1 | 1/2010 | Dumov et al. | |
| 2010/0029266 A1 | 2/2010 | van Gassel et al. | |
| 2010/0080116 A1 | 4/2010 | Agashe et al. | |
| 2010/0121975 A1 | 5/2010 | Sinha et al. | |
| 2010/0157814 A1 | 6/2010 | Ha et al. | |
| 2010/0184432 A1 | 7/2010 | Yano et al. | |
| 2010/0278038 A1 | 11/2010 | Stahle et al. | |
| 2010/0295859 A1 | 11/2010 | Stauffer et al. | |
| 2010/0296428 A1 | 11/2010 | Ho | |
| 2010/0315561 A1 | 12/2010 | Cooper et al. | |
| 2010/0318996 A1 | 12/2010 | Harris et al. | |
| 2010/0322067 A1 | 12/2010 | Tenny | |
| 2010/0322250 A1 | 12/2010 | Shetty et al. | |
| 2010/0331056 A1 | 12/2010 | Nasrabadi et al. | |
| 2011/0044165 A1 | 2/2011 | Ni et al. | |
| 2011/0069650 A1 * | 3/2011 | Singh et al. | 370/311 |
| 2011/0093733 A1 | 4/2011 | Kruglick | |
| 2011/0122884 A1 | 5/2011 | Tsirkin | |
| 2011/0138387 A1 | 6/2011 | Ahn et al. | |
| 2011/0292824 A1 | 12/2011 | Uemura et al. | |
| 2012/0028636 A1 | 2/2012 | Khawer et al. | |
| 2012/0069728 A1 | 3/2012 | Jung et al. | |
| 2012/0079290 A1 | 3/2012 | Kumar et al. | |
| 2012/0093047 A1 | 4/2012 | Khawer et al. | |
| 2012/0110223 A1 | 5/2012 | Khawer et al. | |
| 2012/0120965 A1 | 5/2012 | Khawer et al. | |
| 2012/0131376 A1 | 5/2012 | Khawer et al. | |
| 2012/0134320 A1 | 5/2012 | Khawer et al. | |
| 2012/0155398 A1 | 6/2012 | Oyman et al. | |
| 2012/0207011 A1 | 8/2012 | Franklin et al. | |
| 2013/0017854 A1 | 1/2013 | Khawer | |
| 2013/0061231 A1 | 3/2013 | Zhang et al. | |
| 2013/0117305 A1 | 5/2013 | Varakin et al. | |

FOREIGN PATENT DOCUMENTS

| | | |
|---|---|---|
| WO | WO 01/63416 | 8/2001 |
| WO | WO 02/07464 | 1/2002 |
| WO | WO 2005/098623 | 10/2005 |
| WO | WO 2008/005793 | 1/2008 |

OTHER PUBLICATIONS

Freescale Semiconductor; QorIQ™ P4080 Communications Processor Product Brief; Sep. 2008; Freescale Semiconductor, Inc.; Rev. 1; pp. 2-5, 14-15, 19-22, 28-29.

RapidIO Trade Association; RapidIO™ Interconnect Specification; Jun. 2002; RapidIO™ Trade Association; Rev. 1.2; p. II-10.

Siu, Sam, "An Introduction to the QorIQ™ Data Path Acceleration Architecture (DPAA)"; Jun. 23, 2010; Freescale Semiconductor, Inc; FTF-NET-F0444; pp. 1-21.

Wang, Shrek ; An Introduction to the QorIQ™ Data Path Acceleration Architecture (DPAA); Aug. 2009; Freescale Technology Forum; 1-12.

International Search Report dated Apr. 10, 2012.

US 6,014,703, 01/2000, McCrory et al. (withdrawn).

"Emerson Network Power: AMC-9210 AdvancedMC Module Preliminary Data Sheet", http://powerbridge.de, Jun. 1, 2008, pp. 1-3.

International Search Report dated Oct. 24, 2012.

Freescale Semiconductor; QoIQ™ P4080 Communications Processor Product Brief; Sep. 2008; Freescale Semiconductor, P4080PB; Rev. 1, p. 1-33.

Taiwan Search Report (with English Translation) dated Jan. 16, 2014 (from related U.S. Appl. No. 12/847,414).

Taiwan Search Report dated May 21, 2014 (including English translation).

* cited by examiner

METHOD AND SYSTEM FOR IMPROVED MULTI-CELL SUPPORT ON A SINGLE MODEM BOARD

BACKGROUND OF THE INVENTION

The exemplary embodiments of the invention relate generally to modem boards for use in wireless telecommunications. In particular, various embodiments are directed to techniques for enhancing the real time performance of operating systems such as SMP Linux with PREEMPT RT for multi-cell support on a single modem board using a multi-core processor. While the invention is particularly directed to the art of wireless telecommunications, and will be thus described with specific reference thereto, it will be appreciated that the invention may have usefulness in other fields and applications.

By way of background, LTE (Long Term Evolution) is a rapidly evolving 3GPP project that aims to improve the UMTS (Universal Mobile Telecommunications System) mobile phone standard to cope with future communication network demands. LTE improves wireless network efficiency and bandwidth, lowers costs, and enhances the service experience. Specifically, LTE makes use of new spectrum opportunities and offers better integration with other open standards. LTE generally includes an LTE RAN (Radio Access Network) (also known as E-UTRAN) along with an EPS (Evolved Packet System, also called Evolved Packet Core).

Communication systems are generally split into two primary functions: data plane functions and control plane functions. In previous LTE products, at least two processors were used on the modem board: one to support the control plane functions (non-real time, e.g., Operations, Administration, and Management (or OA&M), and call processing management-related functionalities), and another to terminate and support the data plane functions (real time, e.g., LTE Layer 2 processing). Both the control and data planes used different operating system (OS) instances, such as Linux for the control plane and a real-time OS such as vxWorks (made and sold by Wind River Systems of Alameda, Calif.) for the data plane core. Typically, one modem board supported one sector or cell. So to support multi-cell (e.g., three cells or six cells) configurations, it would be necessary to provide as many modem boards as the number of cells.

As an improvement, a multi-core processor may be used in an LTE wireless base station on a modem board. In that case, an operating system such as SMP Linux with PREEMPT RT patch runs on one SMP (symmetric multiprocessing) partition that contains all eight cores. In this configuration the control plane (non-real time threads and processes) and the data plane (real time threads and processes) share the same operating system instances even though they are bound to run on different cores.

However, open source SMP Linux with PREEMPT RT is not a hard core real time operating system, such as vxWorks. Therefore, to ensure the optimal real time performance from SMP Linux with PREEMPT RT, a number of techniques may be employed to reduce, or even eliminate, the unbounded latency spikes that typically result from the use of such an operating system. The unbounded latency spikes, if not addressed and eliminated, tend to adversely affect the overall system behavior of applications such as the LTE Layer 2 scheduler, possibly rendering the system incapable of deployment.

Thus, there is a need for a method and system for enhancing the real time performance of an operating system such as SMP Linux with PREEMPT RT patch by, for example, (a) disabling non-essential interrupts on the data plane cores that are dedicated to run only the real time processes or threads and routing these interrupts to the control plane core and (b) running certain hardware components in "polling" mode as opposed to the default "interrupt" mode, thereby reducing the number of interrupts generated for a particular data core.

SUMMARY OF THE INVENTION

Described herein are various techniques that may be employed to enhance the real time performance of an operating system (OS) such as SMP Linux with PREEMPT RT patch. SMP Linux with PREEMPT RT is not a hard core, real time operating system. Therefore, it is important to introduce techniques to address the unbounded latency issues that may otherwise arise due to the use of SMP Linux with PREEMPT RT. These unbounded latency spikes could easily affect the proper system behavior of the LTE Layer 2 scheduler, which has very stringent real-time performance needs, thereby rendering the system incapable of deployment. In particular, one of the software techniques that may be employed to enhance the real time performance of the operating system such as SMP Linux with PREEMPT RT involves disabling non-essential interrupts on the data plane cores, which are dedicated to run only the real time processes or threads. Instead, these non-essential interrupts, such as software DMA interrupts, are routed to the control plane core. In addition, at least one of the hardware components (e.g., the queue manager) may be run in "polling" mode as opposed to the default "interrupt" mode, thereby reducing the number of interrupts generated for a particular data core.

In one embodiment, a computer-implemented method of processing data packets in a wireless network with a multi-core processor on a modem board is provided. While running a queue manager in polling mode, a buffer for an incoming data packet is acquired and the data packet is enqueued onto a frame queue, wherein the frame queue comprises a linked list of frame descriptors to be handled by the queue manager. A kernel thread is used to periodically poll the queue manager for queued up frame descriptors and dequeue N frame descriptors from the hardware component, where N is a tunable parameter. A callback function associated with each dequeued frame descriptor in kernel space may be executed, wherein the callback function enqueues a buffer pointer of the data packet within the frame descriptor into a kernel-to-user mapped ring of buffer descriptors for processing. Finally, the data packet is delivered to a messaging module without a context switch.

In another embodiment, a system for processing data packets in a wireless network is provided. The apparatus generally includes a modem board and a multi-core processor comprising a plurality of processor cores attached to the modem board, wherein the modem board comprises kernel space and user space. In addition the system may include a queue manager that is configured to manage queues and run in polling mode and a frame manager that is configured to acquire a buffer for an incoming data packet and enqueue the data packet onto a frame queue, wherein the frame queue comprises a linked list of frame descriptors to be handled by the hardware component. Further, a kernel thread is configured to periodically poll the queue manager for queued up frame descriptors and dequeue N frame descriptors from the hardware component, where N is a tunable parameter. A callback function associated with each dequeued frame descriptor in kernel space is configured to enqueue a buffer pointer of the data packet within the frame descriptor into a kernel-to-user mapped ring of buffer descriptors for processing. Finally, the system may include means for delivering the data packet to a messaging module without a context switch.

In yet another embodiment, a system for providing multi-cell support within a single SMP partition in a telecommunications network is disclosed. The system typically includes a modem board and a multi-core processor having a plurality of processor cores, wherein the multi-core processor is configured to disable non-essential interrupts arriving on a plurality of data plane cores and route the non-essential interrupts to a plurality of control plane cores.

Further scope of the applicability of the present exemplary embodiment will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
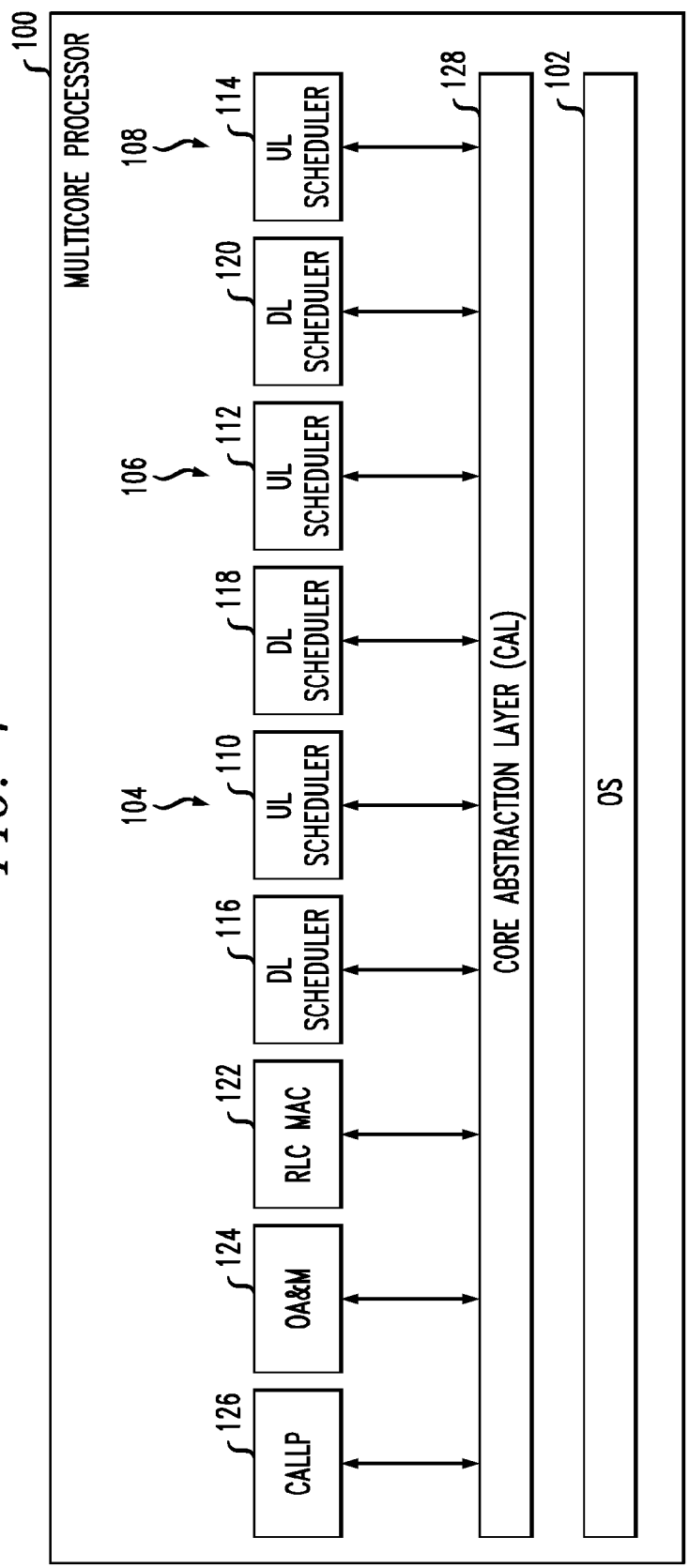
FIG. 1 illustrates one embodiment of a platform architecture in accordance with aspects of the present invention.

Referring now to the drawings wherein the showings are for purposes of illustrating the exemplary embodiments only and not for purposes of limiting the claimed subject matter, FIG. 1 provides a view of a system into which the presently described embodiments may be incorporated.

With reference now to FIG. 1, an exemplary platform architecture 100 is shown. This architecture is generally used on a modem board, but it is to be understood that it may be used in other applications. In this embodiment one partition is defined with all eight cores in it. It is to be appreciated, however, that the multi-core processor 100 may have any number of cores. With this embodiment, it is thus possible to use a single symmetric multiprocessing (SMP) operating system (OS) instance 102 that runs on all of the cores (e.g., eight cores). Since the control and data planes are under one OS instance, care is generally needed to ensure that a problem with the data plane will not bring down the control plane as well.

In this example, the multi-core processor 100 serves three cells (shown as 104, 106, and 108 in the figure). Each cell requires an uplink (UL) scheduler (shown as 110, 112, and 114 in the figure) and a downlink (DL) scheduler (shown as 116, 118, and 120 in FIG. 1).

It is known that the Radio Link Control (RLC) layer is used to segment, concatenate and correct errors on packet frames sent and received across the LTE air interface. The Radio Link Control and Medium Access Control (RLC/MAC) software is used in the GPRS (2.5G) wireless stack. It provides the acknowledged and the unacknowledged data transfer between the mobile station and the base station controller (BSC). Thus, the architecture 100 also includes an RLC/MAC block 122, which is the basic transport unit on the air interface that is used between the mobile station and the network. The RLC/MAC block 122 is generally used to carry data and RLC/MAC signaling.

The multi-core processor 100 also provides Operations, Administration, and Management (OA&M) module 124 and a call processing (or CALLP) module 126. OA&M is generally used to describe the processes, activities, tools, standards, and the like involved with operating, administering, managing and maintaining components in the telecommunications network. The CALLP module 126 typically manages the non-real-time aspects of the call processing activities.

In addition, the multi-core processor 100 includes a core abstraction layer (CAL) 128, which generally hides the core specific details from the Layer 2 (L2) application software, Layer 2 is the Data Link Layer of the seven-layer Open Systems Interconnection (OSI) model of computer networking. The Data Link Layer is the protocol layer that transfers data between adjacent network nodes in a wide area network or between nodes on the same local area network segment. The Data Link Layer provides the functional and procedural means to transfer data between network entities and might provide the means to detect and possibly correct errors that may occur in the Physical Layer. Examples of data link protocols are Ethernet for local area networks (multi-node), the Point-to-Point Protocol (PPP), HDLC and ADCCP for point-to-point (dual-node) connections. In this case, L2 generally refers to the L2 scheduler processing that is needed for the LTE air interface, which has very tight real time requirements.

To meet the real time performance needs of the base station, which is responsible for handling traffic and signaling between a mobile communication device and the network switching subsystem, an operating system such as SMP Linux with PREEMPT RT patch may be used. Of course, it is to be understood that other operating systems may be used. To achieve deterministic behavior in such an SMP configuration, the system is preferably implemented in a manner that employs core reservation and core affinity constructs to achieve a system behavior that is comparable to Asynchronous Multiprocessing (AMP). This is also desirable to get the best performance out of SMP Linux with PREEMPT RT, for example. Use of lockless zero copy services, such as buffer management and messaging services, may also help address any latency issues that may be posed by the use of the SMP Linux with PREEMPT RT operating system.

One of the main functions of the core abstraction layer (128) as shown in FIG. 1 is to provide high-level applications, such as L2 processing, with various services that utilize the full capabilities of the multi-core platform. The core abstraction layer is thus designed to achieve several goals. First, it supports a BED (Backplane Ethernet Driver) interface that is based on the new Data Path Acceleration Architecture (DPAA), while hiding the DPAA and multi-core specific implementations from higher-level application software (i.e., L2 software). (The DPAA is designed to optimize multi-core network processing such as load spreading and sharing of resources, including network interfaces and hardware accelerators.) Second, it utilizes the P4080's DPAA hardware components to provide an accelerated data path for user-plane data in both the ingress and egress directions. Third, it provides as much flexibility as possible so to easily adapt to configuration changes (i.e., without requiring code changes).

An example of a CAL configuration is a DPAA resources configuration for buffer pools, ingress frame queues, and egress frame queues.

As illustrated in FIG. 1, an embodiment of the present invention uses all of the processor cores in one partition. Since it may be difficult for simple Linux to meet all of the hard real-time processing needs, an operating system such as SMP Linux with PREEMPT RT patch is preferred. An open source operating system is also used to reduce the cost. The system further incorporates core affinity and CPU reservation capabilities of SMP Linux to define an AMP-like system behavior within the SMP configuration, which permits six-cell or even nine-cell configurations. Because the operating system instance is shared between non-real time cores (such as the control plane) and real time cores (such as the data planes), problems may arise when a lock is taken by a non-real time threads and processes. A lock may cause a delay for a real time thread or process, since the real time thread or process has to wait for the release of the lock for the data plane core(s). It is known that transport Layer protocols, such as the Transmission Control Protocol (TCP), the User Datagram Protocol (UDP), specify a source and destination port number in their packet headers. A port number is a 16-bit unsigned integer. A process associates its input or output channel file descriptors (sockets) with a port number and an IP address, a process known as binding, to send and receive data via the network. The operating system's networking software has the task of transmitting outgoing data from all application ports onto the network, and forwarding arriving network packets to a process by matching the packets IP address and port numbers. Since the standard Linux protocol stack does not guarantee a lock-less implementation, the exemplary embodiments define a lock-less messaging scheme for a real time process (LTE L2 scheduler) running on data plane cores to send and receive TCP/UDP IP packets, while avoiding the use of the Linux protocol stack. The non-real time processes, such as OA&M running on the control plane core, will continue to use the Linux protocol stack for its normal operation.

Generally, to avoid Linux General Public License (GPL) issues, the LTE L2 scheduler is operated in user space. So to send and receive TCP/UDP IP data from the LTE L2 scheduler, data has to cross the user-kernel space boundary. This step typically requires a data copy. Thus, consuming processor power to copy data from one memory location to another wastes precious resources. Accordingly, it is desirable to provide a method and system that allows for an efficient lock-less, zero copy and non-blocking messaging service for the real time threads and processes running on the data plane cores, while allowing the control plane to operate in its normal manner (such as by using the traditional Linux protocol stack).

Since both the control plane (non-real time processes and threads, such as OA&M and call processing), and the data plane (real time process and threads, such as the LTE L2 scheduler), share the same operating system instance, it is helpful to make sure that there is at least some physical separation of cores on which these two types of activities are conducted.

Figure 2:
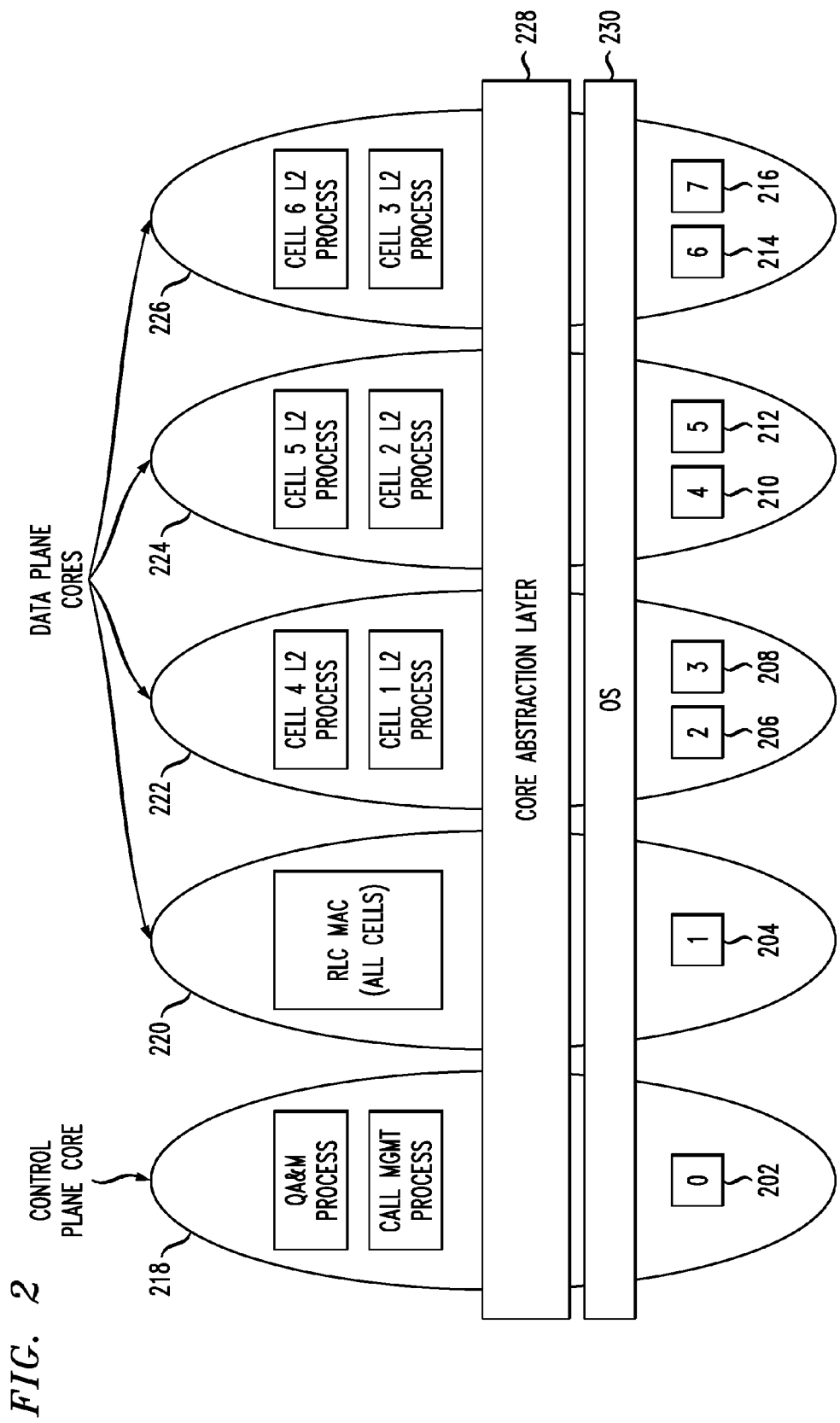
FIG. 2 illustrates an exemplary architecture with core reservation and core affinity in accordance with aspects of the present invention.

In this regard, FIG. 2 illustrates an architecture that employs a core reservation and core affinity construct. In this example, an eight core processor is used. Cores 0-7 are labeled as reference numerals 202, 204, 206, 208, 210, 212, 214, and 216 in the figure. All non-real-time threads or processes will be bound to cores that are dedicated for the control plane activities (218). In other words, core groupings that are dedicated for the data plane activities (labeled as 220, 222, 224, and 226 in the figure) will not host or run any threads that are not directly needed for the "fast path" (data path) implementation or L2 processing. "Fast path" is a term used to describe a path with shorter instruction path length through a program as compared to the "normal path." For a fast path to be effective it must handle the most commonly occurring tasks more efficiently than the normal path, leaving the latter to handle uncommon cases, corner cases, error handling, and other anomalies. Fast paths are a form of optimization. Ingress buffer pools used by a fast path driver are an example of system-wide shared resources. They are dedicated to receive user-plane packets.

To achieve core affinity and core reservation, a default affinity mask to control plane core grouping 218 is defined. In this way any thread or process that has not been assigned specific bindings will default to control plane core(s). A core abstraction layer (CAL) 220 hides the core specific details from the L2 application software. In this configuration there is only one operating system instance 222 running.

The real time processes and threads corresponding to a given cell are bound via core reservation and core affinity to the specified cores. For example, Cell 1 and Cell 4's uplink scheduler thread is bound to core 2, and the downlink scheduler thread is bound to core 3. Thus, FIG. 2 illustrates an AMP-like configuration within the SMP configuration. In this embodiment, for example, all control plane processes and threads, such as OA&M and call management processes, will run on core 0 (202). Each of the cell real-time processes and threads will run on a dedicated core, where no non-real-time process or thread will execute. In this way (1) the non-real time threads will not starve for processing time and (2) the non-real-time thread will not take any valuable processing time away from the real-time threads and do not add to the processing latency spike on the data core that has strict real time processing requirements.

It is generally known that system memory in an operating system such as Linux can be divided into two distinct regions: kernel space and user space. Kernel space is where the kernel (i.e., the core of the operating system) executes (i.e., runs) and provides its services.

Memory generally consists of RAM (random access memory) cells, whose contents can be accessed (i.e., read and written to) at extremely high speeds but are retained only temporarily (i.e., while in use or, at most, while the power supply remains on). Its purpose is to hold programs and data that are currently in use.

User space is that set of memory locations in which user processes (i.e., everything other than the kernel) run. A process is an executing instance of a program. One of the roles of the kernel is to manage individual user processes within this space and to prevent them from interfering with each other.

Kernel space can be accessed by user processes only through the use of system calls. System calls are requests in a Unix-like operating system by an active process for a service performed by the kernel, such as input/output (I/O) or process creation. An active process is a process that is currently progressing in the CPU, as contrasted with a process that is waiting for its next turn in the CPU. I/O is any program, operation or device that transfers data to or from a CPU and to or from a peripheral device (such as disk drives, keyboards, mice and printers).

Thus, kernel space is strictly reserved for running the kernel, kernel extensions, and most device drivers. In contrast, user space is the memory area where all user mode applications work and this memory can be swapped out when necessary.

Figure 3:
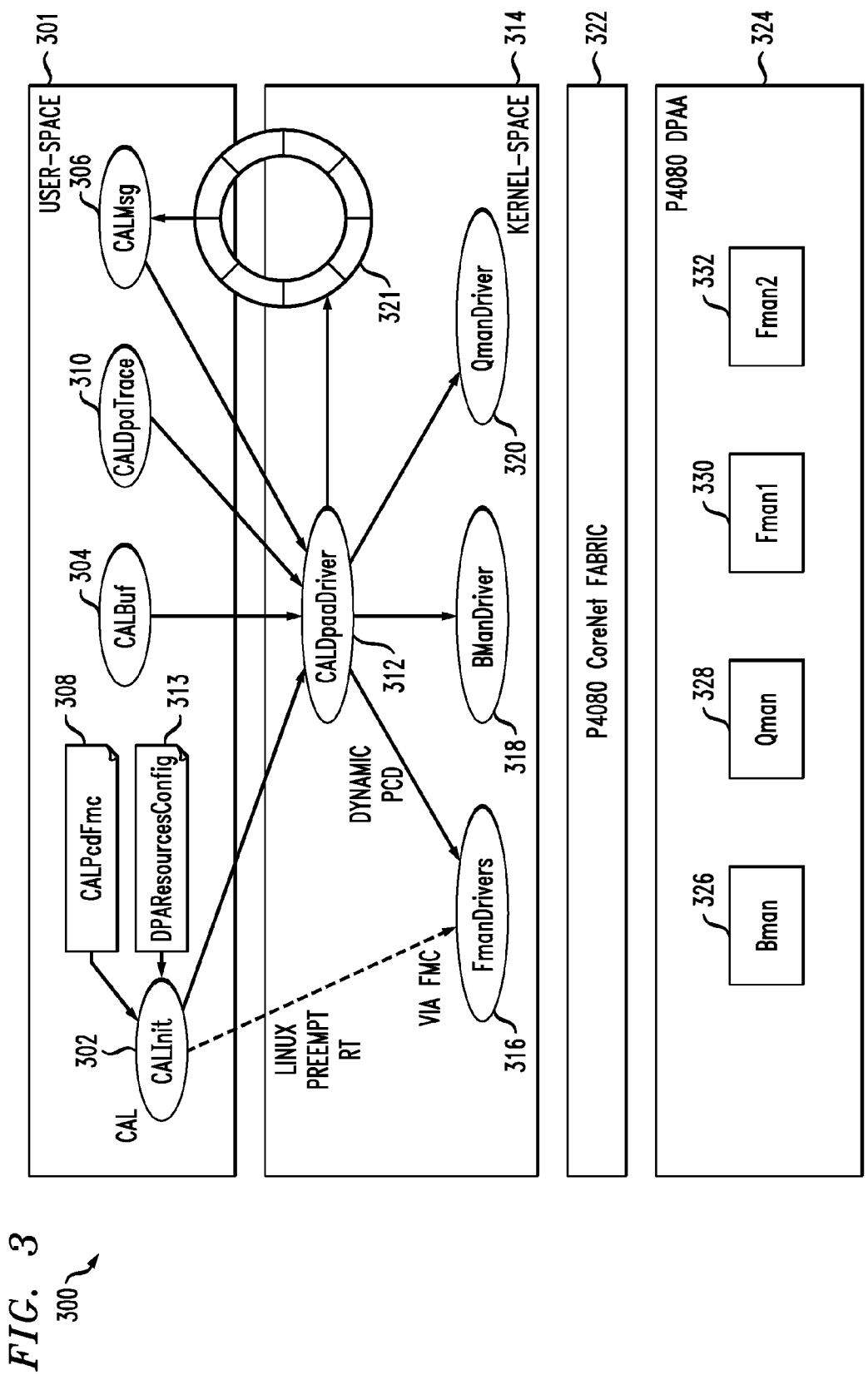
FIG. 3 illustrates an exemplary architecture for implementing the core abstraction layer.

With reference now to FIG. 3, an exemplary architecture 300 that achieves these and other goals is shown. In this regard, the core abstraction layer (CAL) 301 includes various modules in user space, including, but not limited to: a core abstraction layer initialization (CALInit) module 302 that loads the LTE network configuration and any static Parsing, Classification and Distribution (PCD) rules to the frame managers (FMan) 330 and 332 and sets up the CAL framework based on a set of configuration files, a core abstraction layer buffer (CALBuf) module 304, a core abstraction layer messaging (CALMsg) module 306 that provides messaging services to L2 software to send and receive user-plane data to or from another board (i.e., eCCM), a core abstraction layer parsing, classifying and distributing (CALPcdFmc) module 308 that provides PCD rules and configurations to be used by each FMan (330, 332) for routing ingress frames to appropriate cores, and a core abstraction layer DPAA trace (CALDpaaTrace) module 310 that provides tracing capabilities for enabling and disabling traces in the core abstraction layer's DPAA driver (CALDpaaDriver) 312, which is a kernel space module.

Further, the CAL 301 may also include a DPAA resources configuration tool 313 for managing buffer pools, ingress frame queues, and egress frame queues.

The architecture 300 further includes a suitable operating system 314, such as SMP Linux with PREEMPT RT patch. The operating system 314, in turn, supports various drivers, such as the aforementioned CALDPaa driver 312, at least one frame manager (FMan) driver 316, at least one buffer manager (BMan) driver 318, and at least one queue manager (QMan) driver 320. A ring of buffer descriptors 321 is kernel-to-user (K-U) space mapped to allow the user space components, such as the CALMsg module 306, and the kernel space components, such as the CALDpaaDriver 312, to access it without any addressing problems or the need for data copy.

As shown in FIG. 3, the architecture 300 may suitably include a P4080 CoreNet fabric 322, which is an interconnect architecture suitable for scalable on-chip network to connect multiple power architecture processing cores with caches, stand-alone caches and memory subsystems.

The P4080 processor includes an implementation of the DPAA. Thus, the architecture 200 may further include a P4080 DPAA 224. The DPAA 324 is designed to optimize multi-core network processing such as load spreading and sharing of resources, including network interfaces and hardware accelerators. As shown, the DPAA 324 generally includes various managers such as a BMan 326, a QMan 328, and a first and second Fman 330 and 332, respectively.

It is known that in a wireless multiple-access communication system, transmitters and receivers may communicate using a multiple layer communication stack. The layers may include, for example, a physical layer, a medium access control (MAC) layer, a radio link control (RLC) layer, a protocol layer (e.g., packet data convergence protocol (PDCP) layer), an application layer and so on. The RLC layer receives service data units (SDU) from the PDCP layer, and concatenates or segments the SDUs into RLC protocol data units (PDU) for transmission to the MAC layer.

Accordingly, the CALBuf module 304 facilitates lock-less buffer management services for L2 applications for use in the RLC SDU processing. As known in the art, a non-blocking algorithm ensures that threads competing for a shared resource do not have their execution indefinitely postponed by mutual exclusion. A non-blocking algorithm is lock-less (or lock-free) if there is guaranteed system-wide progress. The CALBuf module 304 may also support querying for buffer pool statistical data (e.g., pool depletion state, depletion count, pool availability state, pool allocation error count, etc). The CALBuf module 304 generally interfaces with the CALDpaaDriver 312 to implement such services. The CALBuf module 304 further provides a lock-less buffer management scheme that is preferable for proper system operation in a multi-core environment, where a lock taken by a non-real time process may cause latency issues for a real time process waiting for the release of that lock.

The CALMsg module 306 provides messaging services to L2 software to send and receive user-plane data to or from another board (i.e., eCCM). The CALMsg module 306 generally interfaces with the CALDPAADriver 312 to provide lock-less zero copy messaging services via DPAA. The CALDpaaDriver 312 is the producer of the ring of buffer descriptors 321. In this regard, the CALDpaaDriver 312 enqueue the ingress data flow packet onto the ring of buffer descriptors 321. A user space application, such as the LTE L2 scheduler with help from the CALMsg API, is the typical consumer of the ring of buffer descriptors 321. The user application runs periodically and processes each of the packets enqueued onto the ring of buffer descriptors 321. This feature allows the L2 application software to send and receive TCP/UDP IP packets without the use of a protocol stack, in a lock free, zero data copy manner, so as to avoid un-bounded latency delays.

The CALDpaaDriver 312 is the kernel space component of the CAL 301 and helps implement and provide buffer management services and messaging services using Bman and Oman APIs. As used herein, the term API (or application programming interface) refers to an interface implemented by a software program, which enables it to interact with other software. It facilitates interaction between different software programs similar to the way the user interface facilitates interaction between users and computers. An API is implemented by applications, libraries, and operating systems to determine their vocabularies and calling conventions, and is used to access their services. It may include specifications for routines, data structures, object classes, and protocols used to communicate between the consumer and the implementer of the API.

The CALDpaaDriver 312 is generally responsible for managing DPAA resources (buffer pools and frame queues) to be used for user-plane data distributing; providing user space interface to other CAL modules via various file operations such as open, close, i-o-control (ioctl) for initialization, buffer management, and messaging services; performing kernel-to-user-space (K-U) buffer mapping; providing DPAA buffer pool and receiver and transmitter statistical data; and implementing services for managing ring buffers. It should be noted that ring buffers generally represent the CAL's Layer 2 software queue, and they are used to store frame descriptors (FDs) destined for a specific Layer 2 downlink scheduler thread. The CALMsg module 306 provides APIs for the Layer 2 downlink scheduler to retrieve buffer descriptors from a ring.

The CALBuf module 304 provides buffer management services to be used exclusively for "fast path" data processing. The CALBuf module 304 provides user space APIs to L2 application. The CALBuf module 204 collaborates with the CALDpaaDriver 312 to provide zero copy and lock-less buffer management service for buffers that the CALDpaa driver 312 creates but are managed by the Bman 326.

All of the CAL components described above are generally platform middleware (running in user space), with the exception of the CALDpaaDriver 312. The CALDpaaDriver 312 is a custom driver that runs in kernel space, and it is designed to implement and provide services needed by the CAL user space middleware—in particular, those services that depend on the P4080 DPAA hardware components.

The introduction of lock-less buffer management and messaging services as part of the core abstraction layer for this new architecture helps to avoid unbounded latency spikes in an SMP environment, where both the control plane and the data plane share the same OS instance. In an SMP environment, a lock taken by a non-real-time process or thread on one core (such as those found on the control plane) may cause a latency spike for a real time thread or process waiting for that lock to be released on a different core (such as those found on the data plane). Thus, there is a need for a lock-less, zero copy, non-blocking messaging scheme that does not use the Linux protocol stack for the fast data path on the data plane core to meet the performance needs of a multi-core processor-based modem board that uses one partition. Without such a scheme the system may be subject to unbounded latency spikes that could break down the entire system, especially with respect to the processing of the LTE L2 scheduler.

The use of a zero copy messaging scheme allows the packet arriving on an Ethernet interface in kernel space to reach its destination, such as a Layer 2 downlink scheduler in user space, without the need of a data copy. Due to Linux GPL issues, the LTE L2 scheduler is operated in user space. Therefore, in order to send and receive TCP/UDP IP data from the LTE L2 scheduler, data has to cross the user-kernel space boundary. Such activity would typically require a data copy. Thus, consuming processor power to copy data from one memory location to another wastes precious resources. Accordingly, it is desirable to provide a method and system that allows for an efficient lock-less, zero copy and non-blocking messaging service for the real time threads and processes running on the data plane cores, while still allowing the control plane to operate in its normal manner (such as by using the traditional Linux protocol stack).

Bypassing the Linux protocol stack for fast data path implementation allows the LTE L2 scheduler running on data plane cores to send and receive TCP and UDP IP packets using an alternative lock-less messaging scheme. The use of the Linux protocol stack may result in unbounded latency spikes that may break down the processing of the LTE L2 scheduler. This is due to the fact that the Linux protocol stack is not designed to be lock-less. Further, since the protocol stack is also used by the non-real-time processes and threads, such as OA&M and call processing entities running on the control plane core, it may cause unbounded latency spikes for the real time processes and threads. The protocol stack will be bound to run on the control plane core, so that the non real time processes and threads, such as OA&M and call processing, will continue to use the protocol stack as they can easily withstand the occasional unbounded latency spikes without a breakdown in the system behavior and/or operation.

Figure 4:
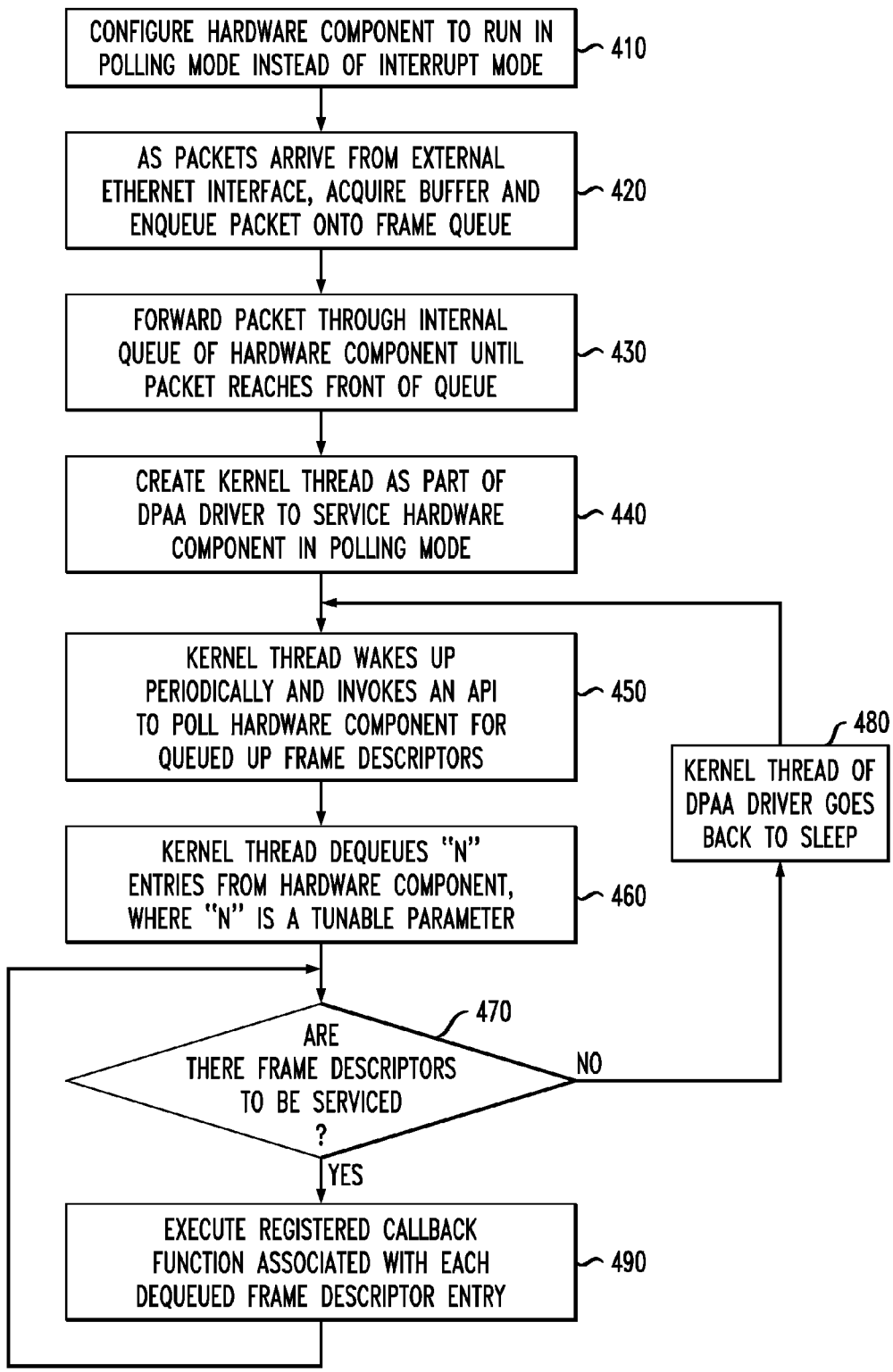
FIG. 4 represents a high-level description of the process flow with respect to an incoming data packet when the hardware is configured to run in polling mode as opposed to the default interrupt mode.

FIG. 4 shows an exemplary method of disabling the interrupts on the data plane cores for an ingress data packet flow. The ingress data flow packets are handled by a kernel thread, which polls the hardware for the packets to reduce the context switch processing overhead associated with each interrupt.

Initially, the hardware (e.g., the QMan 328) is configured to run in "polling" mode, as opposed to the default "interrupt" mode (410). The QMan 328 may be configured to run in polling mode at the beginning, that is, during software initialization when the processor is rebooted. It should be noted that the default interrupt mode is described in greater detail, for example, in U.S. Ser. No. 12/945,146, filed on Nov. 12, 2010, the disclosures of which are incorporated herein by reference.

As data packets continuously arrive on the external Ethernet interface, a frame manager such as the FMan 330 should (1) acquire a buffer from a buffer manager such as the BMan 326, (2) copy the packet into the buffer, and (3) enqueue the packet onto a frame queue (FQ). The frame queue is a hardware linked list of frame descriptors to be handled by a queue manager such as the QMan 328 (420). As used herein, a "linked list" refers to a data structure that consists of a sequence of data records such that in each record there is a field that contains a reference (i.e., a "link") to the next record in the sequence. In this case, each frame descriptor contains a pointer to the buffer that holds the data packet. The QMan 328 manages all of the frame queues created for the system. The FMan 330 uses the PCD rules (e.g., IP address to ingress frame queue mapping) defined by the CAL module 301 to examine each arriving data packet's IP address. The Fman 330 then creates a frame descriptor that contains the pointer to the buffer holding the data packet and enqueues it onto the appropriate frame queue.

The QMan 328 pushes the packet through its internal hardware queue until the packet reaches the front of the hardware queue (430). Significantly, the hardware will NOT generate any portal interrupts to the data plane core.

A kernel thread is created as part of the CALDpaaDriver 312 to service the QMan 328, which is generally configured to run in polling mode in this embodiment (440).

The kernel thread of the CALDpaaDriver 312 wakes up periodically (at periodic time intervals of $\Delta T$) and invokes the QMan API to poll for any queued-up frame descriptors that have reached the front of the hardware queue (450).

The kernel thread will then dequeue (i.e., remove an item from a queue) "N" entries (frame descriptors) from the QMan 328 (460). In this regard, "N" represents a tunable parameter (e.g., N=100). In particular, N indicates the number of frame descriptor entries from the QMan 328 that the kernel thread will service every time it "wakes up."

Next, a determination is made as to whether there are any frame descriptors to be serviced (470). If not, the kernel thread goes back to sleep (490).

Otherwise, the registered callback function associated with each dequeued frame descriptor entry is executed. The callback function delivers the packet to the CALMsg module 306 without any context switch and in a lock-less, zero copy manner. This may be accomplished, for example, by copying the buffer pointer of the data packet from the frame descriptor into a buffer descriptor and enqueuing it onto the appropriate K-U mapped ring of buffer descriptors 321 to be eventually consumed by the user space Layer 2 downlink scheduler (490).

In interrupt mode the arrival of each ingress data packet typically results in an interrupt to the data plane core. Even in interrupt coalescing mode, where up to a maximum of fifteen data packets are handled in one Interrupt Service Routine (ISR), the processing overhead for the user-to-kernel-to-user space context switch is quite significant. This is because the 4G LTE wireless system supports a large number of users, each capable of sustaining a high data rate (average data rate of around 2 MBits/sec). However, by configuring the QMan 328 to run in polling mode as opposed to the default interrupt mode offers several advantages. For example, the scheme outlined above significantly reduces the number of interrupts generated for a particular data core for ingress data flow. This results in a significant reduction in context switching (user-to-kernel-to-user space) that occurs on the data plane core. This leads to a significant reduction in processing overhead on the data plane cores and enhances the real time performance of the LTE system.

Additionally, the non-essential interrupts such as software DMA interrupts are disabled on the data plane cores that are dedicated to run only the real time processes or threads and instead routing these interrupts to occur on the control plane core. This will help to ensure that no unnecessary context switch from a user space application, such as the LTE L2 scheduler to a interrupt service routine (ISR) running in kernel space, will occur on the data plane cores as a result of these interrupts. Each context switch has an appreciable processing overhead involved. By eliminating this unnecessary processing overhead, more processing time and power are given to the data plane cores for the real time processes and threads, such as the LTE L2 scheduler.

A person of skill in the art would readily recognize that steps of various above-described methods can be performed by programmed computers. Herein, some embodiments are also intended to cover program storage devices, for example, digital data storage media, which are machine or computer readable and encode machine-executable or computer-executable programs of instructions, wherein said instructions perform some or all of the steps of said above-described methods. The program storage devices may be, for example, digital memories, magnetic storage media such as a magnetic disks and magnetic tapes, hard drives, or optically readable digital data storage media. The embodiments are also intended to cover computers programmed to perform said steps of the above-described methods.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A computer-implemented method of processing data packets in a wireless network with a multi-core processor on a modem board, the method comprising:
    while running a queue manager in polling mode, acquiring a buffer for an incoming data packet and enqueuing the data packet onto a frame queue, wherein the frame queue comprises a linked list of frame descriptors to be handled by the queue manager;
    using a kernel thread to periodically poll the queue manager for queued up frame descriptors;
    dequeuing N frame descriptors from the hardware component, where N is a tunable parameter;
    executing a callback function associated with each dequeued frame descriptor in kernel space, wherein the callback function enqueues a buffer pointer of the data packet within the frame descriptor into a kernel-to-user mapped ring of buffer descriptors for processing; and
    delivering the data packet to a messaging module without a context switch, wherein the multi-core processor includes one or more data plane cores that are configured to run data plane functions and one or more control plane cores that are configured to run control plane functions and further comprising disabling non-essential interrupts received on the data plane cores and routing the non-essential interrupts to one or more of the control plane cores.

2. The method of claim 1, wherein the queue manager comprises a hardware component and is configured to run in polling mode during software initialization.

3. The method of claim 1, wherein a buffer manager provides the buffer for the incoming data packet.

4. The method of claim 1, wherein the multi-core processor is configured so that non-real-time threads and processes are bound to processor cores that are dedicated for control plane activities and processor cores that are dedicated for data plane activities will not host or run threads that are not directly needed for data path implementation or Layer 2 processing.

5. A system for processing data packets in a wireless network, the system comprising:
    a modem board;
    a multi-core processor comprising a plurality of processor cores attached to the modem board, wherein the modem board comprises kernel space and user space, and wherein one or more of the processor cores are configured to run data plane functions and one or more of the processor cores are configured to run control plane functions and the multi-core processor is configured to disable non-essential interrupts received on the data plane cores and route the non-essential interrupts to one or more of the control plane cores;
    a queue manager that is configured to manage queues and run in polling mode;
    a frame manager that is configured to acquire a buffer for an incoming data packet and enqueue the data packet onto a frame queue, wherein the frame queue comprises a linked list of frame descriptors to be handled by the hardware component;
    a kernel thread that is configured to periodically poll the queue manager for queued up frame descriptors and dequeue N frame descriptors from the hardware component, where N is a tunable parameter; and
    a callback function associated with each dequeued frame descriptor in kernel space that is configured to enqueue a buffer pointer of the data packet within the frame descriptor into a kernel-to-user mapped ring of buffer descriptors for processing
    and to deliver the data packet to a messaging module without a context switch.

6. The system of claim 5, wherein the queue manager comprises a hardware component.

7. The system of claim 5, wherein the multi-core processor is configured so that non-real-time threads and processes are bound to processor cores that are dedicated for control plane activities and processor cores that are dedicated for data plane activities will not host or run threads that are not directly needed for data path implementation or Layer 2 processing.

8. The system of claim 5, wherein the multi-core processor is configured to include a core abstraction layer that hides core specific details from application software running on the processor cores.

9. The system of claim 5, wherein the multi-core processor is configured to serve at least six cells in the telecommunications network.

10. The system of claim 5, wherein the multi-core processor comprises eight processor cores.

11. The system of claim 5, wherein a single operating system instance runs on the cores.

12. A system for providing multi-cell support within a single symmetric multiprocessing (SMP) partition in a telecommunications network, the system comprising:
    a modem board; and
    a multi-core processor having a plurality of processor cores, wherein a plurality of the processor cores are configured to run data plane functions and a plurality of the processor cores are configured to run control plane functions and the multi-core processor is configured to disable non-essential interrupts arriving on a plurality of the processor cores configured to run data plane functions and route the non-essential interrupts to a plurality of the processor cores configured to run control plane functions.

13. The system of claim 12, wherein the multi-core processor is configured so that non-real-time threads and processes are bound to processor cores that are dedicated for control plane activities and processor cores that are dedicated for data plane activities will not host or run threads that are not directly needed for data path implementation or Layer 2 processing.

14. The system of claim 12, wherein the multi-core processor is configured to include a core abstraction layer that hides core specific details from application software running on the processor cores.

15. The system of claim 12, wherein the multi-core processor is configured to serve at least six cells in the telecommunications network.

16. The system of claim 12, wherein the multi-core processor comprises eight processor cores.

17. The system of claim 12, wherein a single operating system instance runs on the cores.

* * * * *